United States Patent [19]

Watanabe

[11] Patent Number: 4,725,941
[45] Date of Patent: Feb. 16, 1988

[54] HIGH-VOLTAGE/LARGE-CURRENT GENERATOR APPARATUS AND METHOD FOR GENERATING HIGH-VOLTAGE/LARGE-CURRENT

[75] Inventor: Yukio Watanabe, Tokorozawa, Japan

[73] Assignee: Kabushiki Kaisha Toshiba, Kawasaki, Japan

[21] Appl. No.: 939,108

[22] Filed: Dec. 8, 1986

[30] Foreign Application Priority Data

Dec. 16, 1985 [JP] Japan ................... 60-282403

[51] Int. Cl.$^4$ ............................................. H02M 7/12
[52] U.S. Cl. ........................................ 363/87; 363/54; 363/129
[58] Field of Search .............. 363/128, 129, 85, 87, 363/54; 361/139, 141, 152

[56] References Cited

U.S. PATENT DOCUMENTS

| 4,084,221 | 4/1978 | Ogata ......................... 363/85 X |
| 4,523,267 | 6/1985 | Mehl .......................... 363/129 X |
| 4,599,685 | 7/1986 | Hombu et al. ............... 363/87 X |

FOREIGN PATENT DOCUMENTS

| 3984751 | 10/1976 | Japan ........................ 307/104 |
| 0081624 | 5/1982 | Japan ........................ 363/87 |
| 2116786 | 9/1983 | Japan ........................ 363/87 |

*Primary Examiner*—Patrick R. Salce
*Assistant Examiner*—Kristine L. Peckman
*Attorney, Agent, or Firm*—Oblon, Fisher, Spivak, McClelland & Maier

[57] ABSTRACT

An apparatus of the invention includes an AC power source for providing AC electric power, a thyristor converter, being formed of self-extinctive switching elements, for converting the AC electric power to a DC excitation current, a coil for storing magnetic energy corresponding to the excitation current, and a bypass circuit coupled in parallel to the coil. The above apparatus uses a method having the steps of: (a) circulating the excitation current between the thyristor converter and the coil when the excitation current reaches a reference value, and (b) commutating the circulated excitation current from the thyristor converter to the bypass circuit after a given elapsed period of time from when the excitation current reaches the reference value, so that the coil generates a high voltage or induces a large current corresponding to the magnitude of the stored magnetic energy.

9 Claims, 15 Drawing Figures

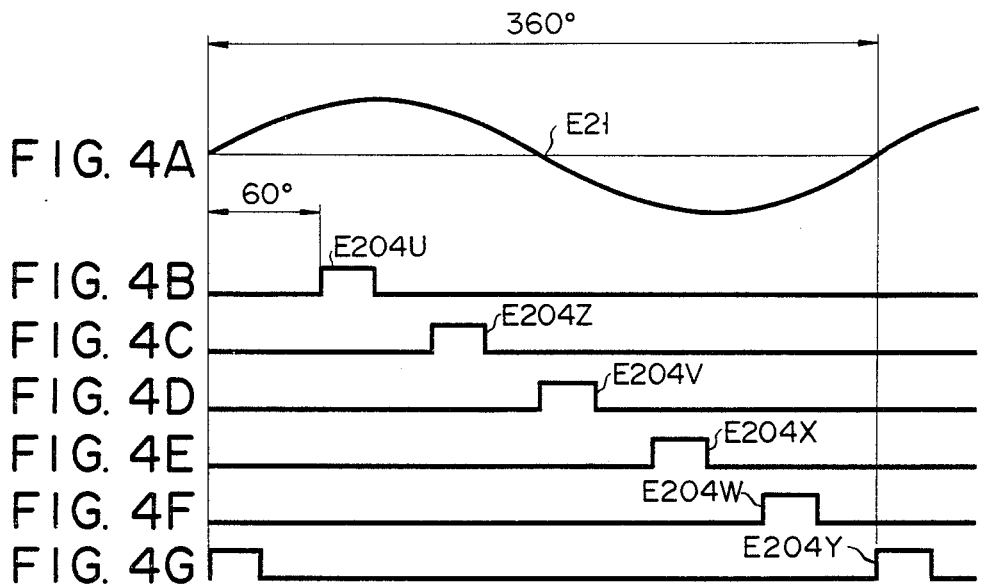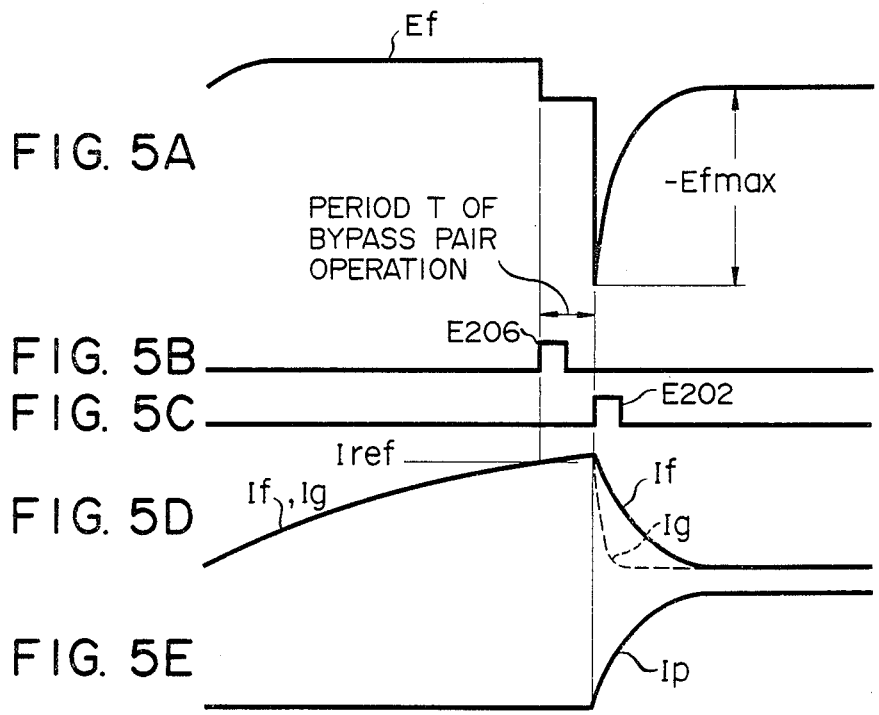

HIGH-VOLTAGE/LARGE-CURRENT GENERATOR APPARATUS AND METHOD FOR GENERATING HIGH-VOLTAGE/LARGE-CURRENT

BACKGROUND OF THE INVENTION

The present invention relates to a high-voltage/large-current generator apparatus and a method for generating a high-voltage/large-current which can be used for exciting a plasma.

As one plasma exciting method, the following method has been known. The plasma exciting is performed by means of a high-voltage generated across a current transformer coil through which a rapidly-changed large current flows. This rapid change of the current can be obtained by commutating the coil current to a resistor so that the current from a DC power source to the current transformer coil is quickly cut off. This method, however, requires a high-power and high-speed DC circuit breaker.

Meanwhile, for actual development of a power generator or the like which is applied to a nuclear fusion process using a gas plasma, realization of a highly-reliable, high-speed and low-cost DC circuit breaker is materially important.

A vacuum circuit breaker, gas circuit breaker, semiconductor circuit breaker, and the like, are known as a DC circuit breaker. Among these, the semiconductor circuit breaker is one of most advantageous devices because it has a semi-permanent working life, high reliability, and maintenance-free features, etc. However, when a high-voltage and large-current type DC circuit breaker is to be used, the cost of the semiconductor circuit breaker device becomes very high because a large number of series/parallel-connected semiconductor elements are required.

In a plasma exciter apparatus for nuclear fusion or the like, the magnitude of a current to be flowing through a current transformer coil reaches several tens of kilo amperes to several hundreds of kilo amperes, and the magnitude the voltage generated across the both ends of the current transformer coil at the time of cutting off the current exceeds several tens of kilo volts. Consequently, to obtain a high-withstanding voltage and large current capacity, a prior art apparatus requires a large number of semiconductor elements both for a thyristor converter and a DC circuit breaker, resulting in complicating the circuit configuration of the apparatus and significantly increasing the cost thereof. This is the shortcoming of the prior art.

SUMMARY OF THE INVENTION

It is accordingly an object of the present invention to provide a high-voltage/large-current generator apparatus and a method for generating a high-voltage/ large-current, by which the circuit configuration of the apparatus can be simplified.

Another object of the present invention is to provide a plasma exciter apparatus in which a discrete DC circuit breaker is omitted so that the size and cost thereof can be reduced.

To achieve the above object, the present invention uses a power converter comprising self-extinctive switching elements (e.g., gate turn-off thyristors) to which the function of a DC circuit breaker is assigned.

BRIEF DESCRIPTION OF THE DRAWINGS

FIGS. 4A to 4G are timing charts explaining the operation of the 6-phase pulse generator shown in FIG. 2; and FIGS. 5A to 5E illustrate voltage and current waveforms of respective portions in FIGS. 1 and 2.

DETAILED DESCRIPTION OF THE PREFERRED EMBODIMENTS

Figure 1:
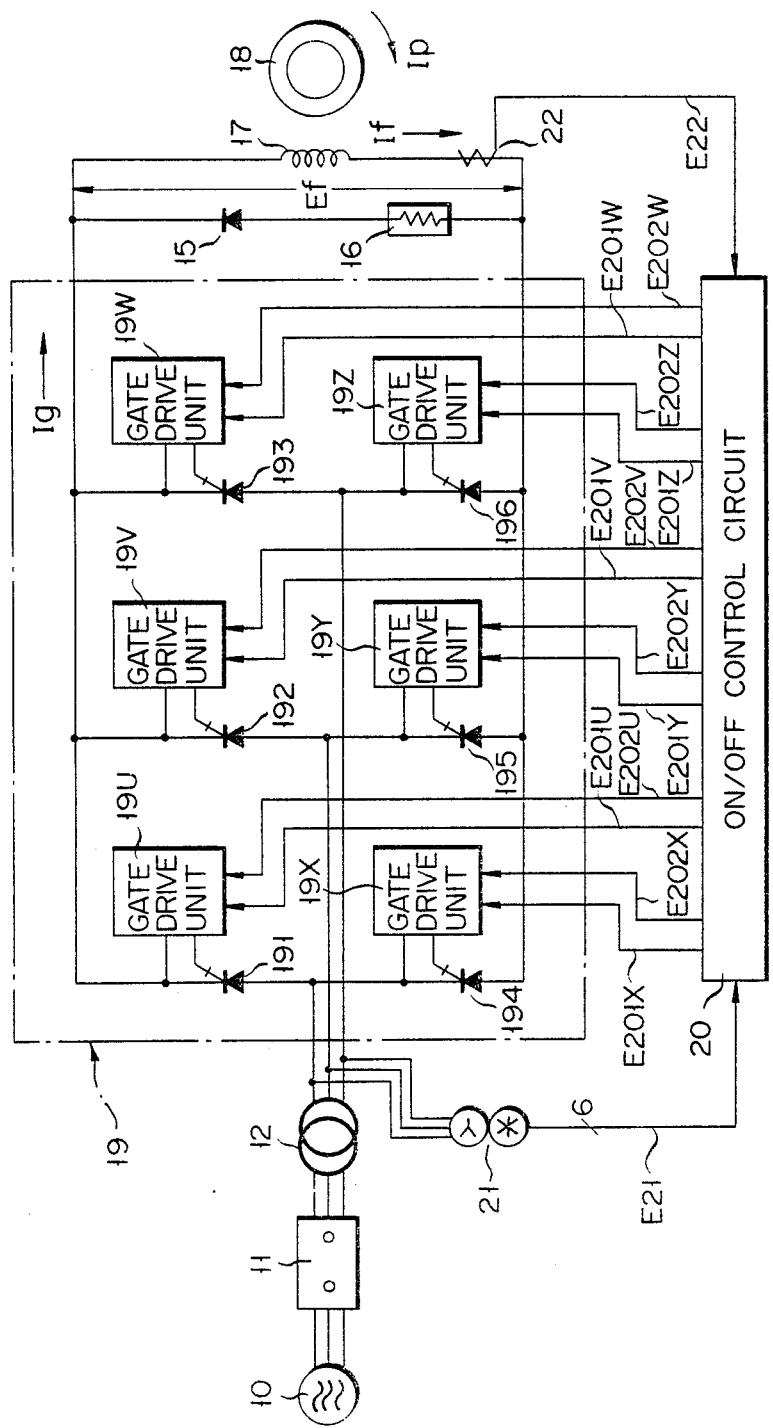
FIG. 1 is a circuit diagram of a plasma exciter (high-voltage/large-current generator) apparatus according to embodiment of the present invention.

Hereinafter, preferred embodiments of the invention will be described in detail with reference to the accompanying drawings. In the following description, the same or similar elements are denoted by the same or similar reference numerals throughout the drawings, thereby avoiding redundant explanations.

FIG. 1 is a circuit diagram of a high-voltage/large-current generator for exciting a plasma according to an embodiment of the present invention. In FIG. 1, the numeral 10 denotes a 3-phase AC power source; 11, an AC circuit breaker; 12, a rectifier transformer; 19, a thyristor converter whose arm elements 191-196 are respectively made of self-extinctive gate turn-off thyristors (hereinafter referred to as GTOs); 19U-19Z, gate drive units for driving arm elements 191-196, respectively; 15, a diode; 16, a resistor; 17, a current transformer coil; 18, a plasma generating block having a function of a one-turn-coil transformer; 20, an on/off control circuit for controlling GTOs 191-196; 21, a 3-phase/6-phase potential transformer; and 22, a DC current transformer.

Figure 2:
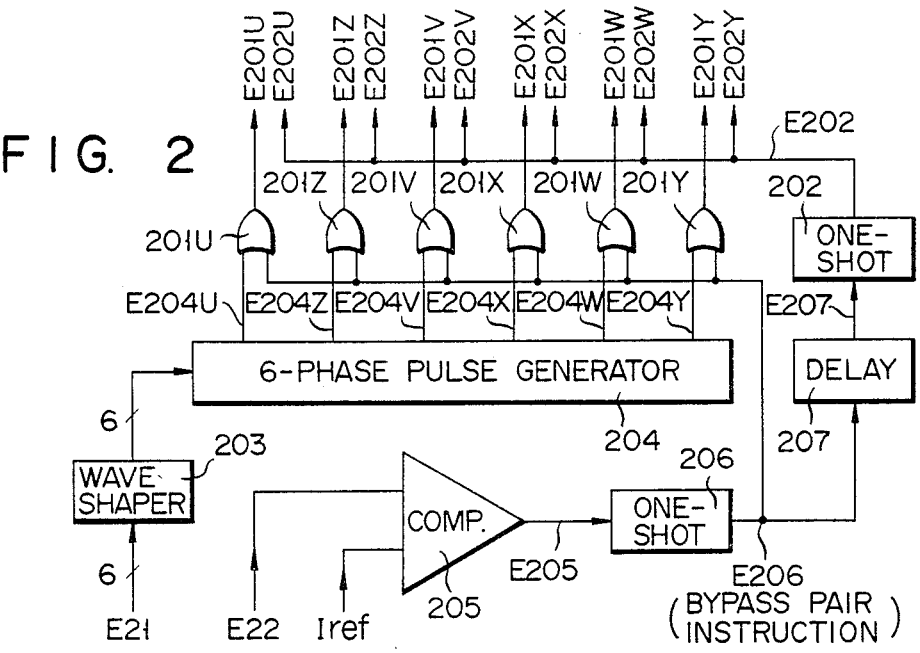
FIG. 2 is an on/off control circuit for controlling the gate turn-off thyristors in the embodiment of FIG. 1.

Details of on/off control circuit 20 are shown in FIG. 2. The voltage of U-, V-, W-, X-, Y-, and Z-phases is detected via potential transformer 21 in FIG. 1, and detected 6-phase voltages E21 are input to wave shaper 203 in FIG. 2. The 6-phase wave-shaped voltage outputs from wave shaper 203 are supplied, as clock signals, to 6-phase pulse generator 204. Generator 204 generates six on-gate pulses E204U, E204V, E204W, E204X, E204Y, and E204Z. The phase angle difference between adjacent on-gate pulses is 60 degrees, as shown in FIGS. 4A to 4G.

When thyristor converter 19 shown in FIG. 1 operates in a rectifier mode, it supplies current Ig to current transformer coil 17 so that coil current If flows therethrough. The magnitude of current If (or Ig), flowing through current transformer coil 17, is detected via DC current transformer 22, and signal E22, representing the detected current magnitude, is input to comparator 205 shown in FIG. 2. Comparator 205 receives current reference Iref and compares the level of signal E22 with that of reference Iref (cf. FIG. 5D). When current If (Ig) increases and the level of detected current signal E22 reaches reference Iref, comparator 205 outputs trigger pulse E205. The rising edge of pulse E205 triggers one-shot 206. Then, one-shot 206 generates pulse E206 used for a bypass pair instruction (cf. FIG. 5B).

Pulse E206 is delayed by delay circuit 207. The rising edge of delayed pulse E207, output from circuit 207, triggers one-shot 202. Then, one-shot 202 generates pulse E202 (cf. FIG. 5C) used for each of off-gate pulses E202U, E202V, E202W, E202X, E202Y, and E202Z.

On-gate pulses E204U, E204V, E204W, E204X, E204Y, and E204Z are input to OR gates 201U, 201V, 201W, 201X, 201Y, and 201Z, respectively. Each of these OR gates receives bypass pair instruction E206. Then, OR gates 201U, 201V, 201W, 201X, 201Y, and 201Z output six on-gate pulses E201U, E201V, E201W, E201X, E201Y, and E201Z, respectively.

The pair of pulses E201U and E202U are input to gate drive unit 19U for GTO 191. Similarly, the pair of E201V and E202V are input to gate drive unit 19V for GTO 192, the pair of E201W and E202W are input to gate drive unit 19W for GTO 193, the pair of E201X and E202X are input to gate drive unit 19X for GTO 194, the pair of E201Y and E202Y are input to gate drive unit 19Y for GTO 195, and the pair of E201Z and E202Z are input to gate drive unit 19Z for GTO 196.

Figure 3:
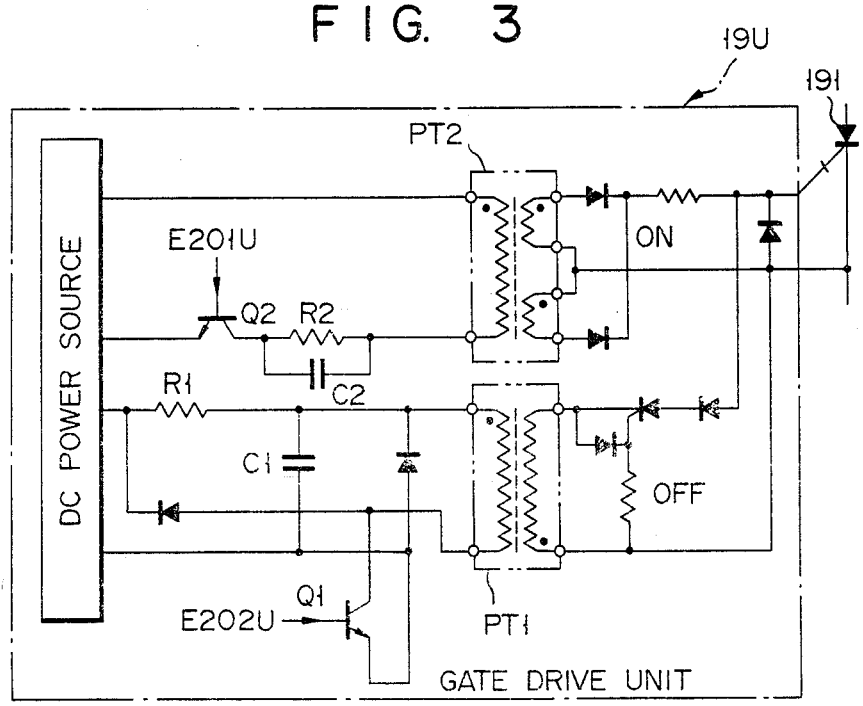
FIG. 3 shows a circuit configuration of the gate drive unit provided for each gate turn-off thyristor in the embodiment of FIG. 1.

Gate drive units 19U-19Z may have the same circuit configuration. An example (unit 19U) of the circuit configuration of each of the gate drive units is shown in FIG. 3. In FIG. 3, the primary winding of pulse transformer PT1 is coupled, via npn transistor Q1 and a C1, R1 filter, to a DC power source. The base of transistor Q1 receives off-gate pulse E202U. The primary winding of pulse transformer PT2 is coupled, via npn transistor Q2 and a parallel C2, R2 circuit, to the DC power source. The base of transistor Q2 receives on-gate pulse E201U. The secondary output of transformer PT2 is rectified to provide a positive turn-on pulse which is applied to the gate of GTO 191. The secondary output of transformer PT1 is rectified to provide a negative turn-off pulse which is also applied to the gate of GTO 191. Thus, GTO 191 is turned on when on-gate pulse E201U is supplied to transistor Q2, and it is turned off when off-gate pulse E202U is supplied to transistor Q1.

Incidentally, in place of the circuit of FIG. 3, the circuit of FIG. 2 on page 219 of the following document can be used:

"PESC '81 RECORD," IEEE Power Electronics, SPECIALISTS CONFERENCE-1981, University of Colorado, Boulder, Colo., June 29—July 3, 1981.

The disclosure of this document is now incorporated in the present patent application.

The circuit of FIGS. 1-3 operates as follows. Assume that thyristor converter 19 operates in a rectifier mode, and current Ig (If) (FIG. 5D) flows through the power source circuit, current transformer coil 17 and GTOs 191 and 196. When current Ig (If) reaches a prescribed value defined by current reference Iref, bypass pair instruction E206 (FIG. 5B) is generated. Then, AC circuit breaker 11 opens so that thyristor converter 19 is free of AC power supplied from power source 10, and all of GTOs 191-196 are turned on by the generation of on-gate pulses E201U, E201V, E201W, E201X, E201Y, and E201Z. Then, current Ig (If) flows, through GTO 191, coil 17, and GTO 194, through GTO 192, coil 17, and GTO 195, and through GTO 193, coil 17, and GTO 196. Namely, current Ig causes the current (If) of current transformer coil 17 to flow through all GTO pairs (bypass pairs) 191+194, 192+195 and 193+196 during bypass pair operation period T shown in FIG. 5B.

Following this, off-gate pulses E202U, E202V, E202W, E202X, E202Y, and E202Z are applied to respective GTOs 191-196 so that all of GTOs 191-196 are turned off, thereby cutting off the currents (Ig in FIG. 5D) flowing through these GTOs. Then, current Ig is commutated to the bypass circuit of resistor 16 and diode 15, so that a high-voltage (−Efmax in FIG. 5A) is generated across the both ends of current transformer coil 17. (The peak value of high-voltage −Efmax can be adjusted in accordance with the value of resistor 16.) By the generation of high-voltage −Efmax, a large plasma exciting current (Ip in FIG. 5E) flows through the one-turn coil configuration of plasma generating block 18.

Incidentally, current Ig has the following functions:
(1) during the rectifier mode, Ig causes a current (If) to flow through coil 17;
(2) during the bypass pair mode, Ig renders the coil current (If) to be circulated between the turned-on GTOs (191–196) and coil 17; and
(3) during the GTO-off mode, Ig is commutated to the resistor circuit (15, 16).

In summary, on/off control circuit 20 controls thyristor converter 19, such that an excitation current (Ig, If) is circulated between thyristor converter 19 and coil 17 when the magnitude of the excitation current (Ig, If) reaches a predetermined reference value (Iref), and that the circulated excitation current (Ig) is commutated from converter 19 to a bypass circuit (15–16) after a given elapsed period of time (T) from when the magnitude of the excitation current (Ig, If) reaches the predetermined reference value (Iref).

According to the present embodiment, a discrete DC circuit breaker is not required, because GTOs 191-196 in thyristor converter 19 can be used for cutting off the current (Ig) flowing through converter 19 and thus they have the function of a DC circuit breaker. Further, according to this embodiment, the number of semiconductor elements required for the thyristor converter can be roughly determined by the number of semiconductor elements to be used for cutting off the DC current (Ig). In addition, when the thyristor converter, using self-extinctive semiconductor elements, operates in a rectifier mode, the pulse-width of the electric conduction angle can be readily controlled, thereby achieving a high-speed-response control at the rising edge of the current transformer coil current (If), and enabling the power factor control of the converter.

In the above-mentioned embodiment, after the bypass pair operation of thyristor converter 19 starts (T in FIG. 5B), the current (If), flowing through current transformer coil 17, is divided by all arm elements (GTOs 191-196) in response to the circuit-open of AC circuit breaker 11. For this reason, the current capacity of each of the arm elements can be small. (In the embodiment of FIG. 1, the necessary current capacity of each of GTOs 191-196 is ⅓ of the current capacity required when only one bypass pair (e.g., 191 and 194) is turned on and a circulated current (If) fully flows through this one bypass pair.)

Incidentally, if an element with a large current-handling capacity is used for each arm element, the circuit-open of AC circuit breaker 11 may not be performed. In this case, a cutoff instruction (offgate signal E202) is applied to each conducted arm element during the bypass pair operation period (T) of thyristor converter 19. Such a modification can also possess the advantage of the embodiment of FIG. 1.

As mentioned above, according to the present invention, since self-extinctive semiconductor elements (GTOs) are used to constitute the thyristor converter, the thyristor converter can not only control the current of a current transformer coil and circulate the current, but also can cut off the circulated current, thereby effectively reducing the necessary number of semiconductor elements used in the apparatus, so that a small and low-cost plasma exciter apparatus can be provided.

Incidentally, high-power bipolar transistors or high-power-MOS transistors can be used for the self-extinctive semiconductor elements (191-196) of the thyristor converter, as the case may be.

In addition, the apparatus of this invention can be used for exciting a superconducting magnet, etc. (In this case, a large current (Ip) in the embodiment of FIG. 1 is supplied to the superconducting magnet.)

While the invention has been described in connection with what is presently considered to be the most practical and preferred embodiment, it is understood that the invention is not to be limited to the disclosed enbodiment but, on the contrary, is intended to cover various modifications and equivalent arrangements included within the scope of the appended claims, whose scope is to be accorded the broadest interpretation so as to encompass all such modifications and equivalent structures.

What is claimed is:

1. A high-voltage/large-current generator apparatus comprising:
   power source means for providing electric power;
   converter means, having self-extinctive switching elements and coupled to said power source means, for converting said electric power into an excitation current by the switching operation of said self-extinctive switching elements;
   output means, coupled to said converter means, for storing magnetic energy corresponding to said excitation current;
   a bypass circuit coupled to said output means; and
   control means coupled to said converter means and being responsive to said excitation current, for circulating said excitation current in a bypass pair mode between said converter means and said output means when the magnitude of said excitation current reaches a predetermined reference value, and for commutating the circulated excitation current from said converter means to said bypass circuit after a given period of time elapses from where the magnitude of said excitation current reaches said predetermined reference valve, thereby generating from said output means a high voltage or a large current corresponding to the magnitude of the stored magnetic energy;
   wherein said power source means includes an AC power source for providing AC electric power, and an AC circuit breaker for stopping the feeding of said AC electric power from said AC power source to said converter means, the feeding of said AC electric power being stopped by said AC circuit breaker when the magnitude of said excitation current reaches said predetermined reference value and wherein said converter means converts said AC electric power into a DC current used for said excitation current.

2. An apparatus according to claim 1, wherein said output means includes means for exciting a plasma in accordance with said stored magnetic energy.

3. An apparatus according to claim 1, wherein said bypass circuit includes a series circuit of a diode and a resistor, said diode rendering only the commutated excitation current to flow through said resistor which serves to determine the magnitude of said high voltage.

4. An apparatus according to claim 1, wherein said AC electric power is obtained from a 3-phase AC voltage, and said converter means includes a 3-phase switching element bridge which is formed of first, second and third arms.

5. An apparatus according to claim 4, wherein said control means includes bypass pair instruction means, coupled to said 3-phase switching element bridge, for rendering at least one of said first, second and third arms conductive when the magnitude of said excitation current reaches said predetermined reference value, so that the conducted arm feeds said output means with the circulated excitation current.

6. An apparatus according to claim 5, wherein said control means further includes turn-off means, coupled to said 3-phase switching element bridge, for rendering all of said first, second and third arms nonconductive after said given elapsed period of time, so that said stored magnetic energy is released to generate said high voltage or said large current.

7. An apparatus according to claim 4, wherein said control means includes bypass pair instruction means, coupled to said 3-phase switching element bridge, for rendering all of said first, second and third arms conductive when the magnitude of said excitation current reaches said predetermined reference value, so that the conducted first, second and third arms feed said output means with said circulated excitation current.

8. An apparatus according to claim 7, wherein said control means further includes turn-off means, coupled to said 3-phase switching element bridge, for rendering all of said first, second and third arms nonconductive after said given elapsed period of time, so that said stored magnetic energy is released to generate said high voltage or said large current.

9. A method for generating high-voltage or large-current, which is applied to an apparatus comprising power source means for supplying electric power; converter means, having self-extinctive switching elements, for converting said electric power to an excitation current coil means for storing magnetic energy corresponding to said excitation current; and a bypass circuit coupled to said coil means,
   said method comprising the steps of:
   (a) circulatng said excitation current in a bypass pair mode between said converter means and said coil means when the magnitude of said excitation current reaches a reference value,
   (b) stopping the supply of said electric power to said converter means when the magnitude of said excitation current reaches said reference value, and
   (c) commutating the circulated excitation current from said converter means to said bypass circuit after a given period of time elapses from when the magnitude of said excitation current reaches said reference value, so that said coil means generates a high voltage or a large current corresponding to the magnitude of the magnetic energy stored in said coil means.

* * * * *